April 27, 1965   D. A. SCHNEIDER   3,180,471
CONVEYOR STARTER

Filed June 10, 1963   4 Sheets-Sheet 1

INVENTOR.
DONALD A. SCHNEIDER
BY
ATTORNEYS

INVENTOR.
DONALD A. SCHNEIDER
BY
ATTORNEYS

April 27, 1965   D. A. SCHNEIDER   3,180,471
CONVEYOR STARTER
Filed June 10, 1963   4 Sheets-Sheet 3
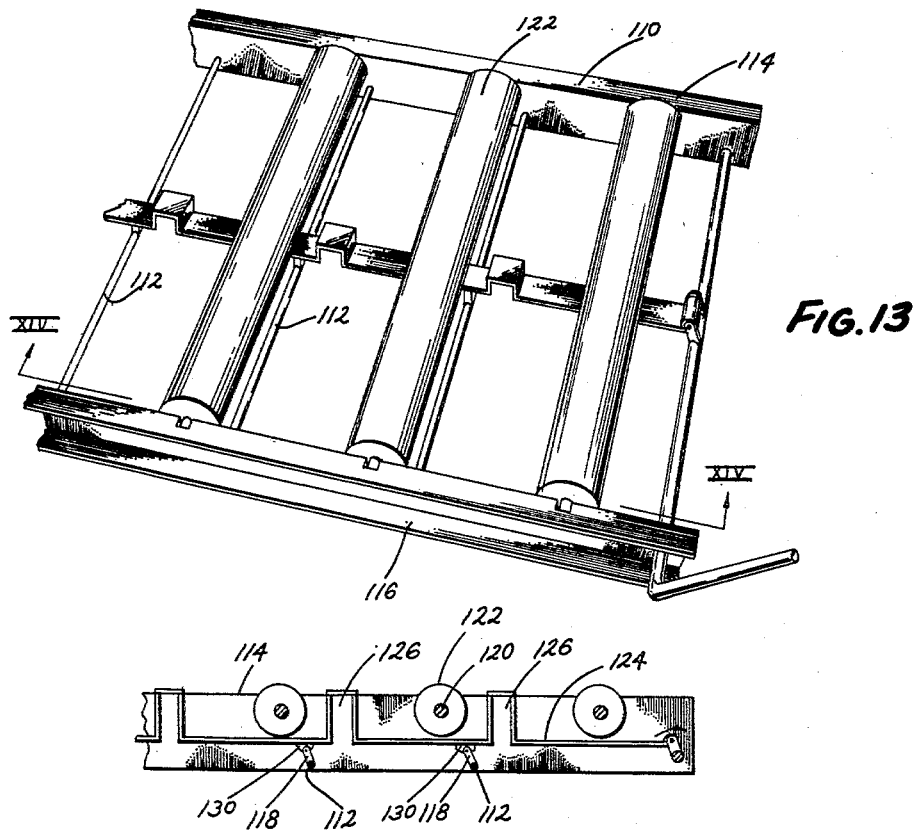
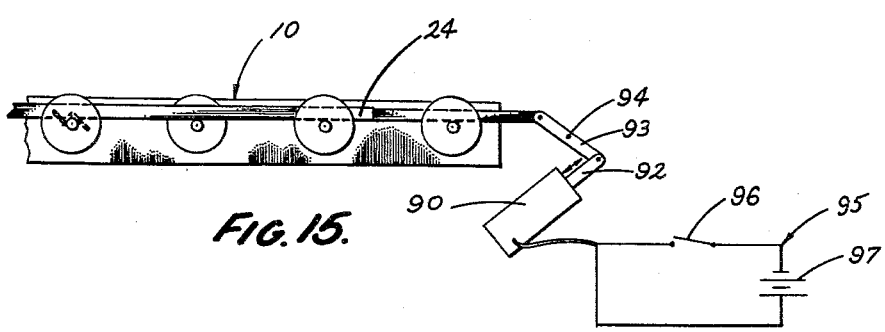
INVENTOR.
DONALD A. SCHNEIDER
BY
*Price & Heneveld*
ATTORNEYS

United States Patent Office 3,180,471
Patented Apr. 27, 1965

3,180,471
CONVEYOR STARTER
Donald A. Schneider, Ada, Mich., assignor to The Rapids-Standard Company, Inc., Grand Rapids, Mich., a corporation of Michigan
Filed June 10, 1963, Ser. No. 292,512
6 Claims. (Cl. 193—35)

This invention relates to storage equipment and more particularly to an article starter in combination with a storage rack to nudge articles into movement.

Storage racks employing conveyor wheels are commonplace in manufacturing and warehousing establishments, among others. Conventionally, hundreds of cartons filled with various articles are placed end to end on these racks, which may extend 50 to 100 feet or more in length. The racks are often several bays deep to use available space in an efficient manner. Each individual rack ordinarily includes a pair of spaced side rails and hundreds or thousands of conveyor wheels mounted on parallel axles. Each rack is provided with a definite pitch to cause the cartons to roll against a stop at the lower end when the lowermost carton or cartons are removed.

Since the cartons, usually of cardboard or paperboard, are often filled with heavy articles, the conveyor wheels regularly create a plurality of indentations into the carton bottom after it remains in one position in storage for a period of time. Consequently, the cartons resist movement along the rack even when lower cartons are removed since the wheels must first be moved out of their respective indentations before the carton can roll down the slanted rack.

As a result, the racks are placed at a substantial pitch of about 8" per 10'. Even so, the cartons often hang-up. If the pitch is increased even further, to prevent the hang-up, the carton speed becomes excessive, the pressure of cartons upon each other often becomes excessive, and fewer bays can be accommodated vertically. Manual starting of the cartons by workers often requires extensive efforts and time to reach a carton deep in the rack.

Another related area where similar problems arise is that of gravity conveyors. Gravity conveyors of substantial lengths are often encountered in today's manufacturing, storage, and handling establishments. Many times it is desirable to have only a slight pitch on gravity conveyors to control the speed of articles thereon, to limit the pressure between articles when piled up in storage against a gate, because of height limitations in a building, or for other reasons. Yet, when employing only a slight slant, stopped articles do not begin moving again when released from a stop. Articles conveyed on gravity conveyors are often purposely halted by a gate to control routing, loading, spacing, packing, marking, filling, or a variety of other functions. The articles also sometimes stop each other on overcrowded equipment. Unless the conveyor pitch is large, the articles tend to remain stationary even when the gate is reopened, or the obstacle is removed. This is obviously undesirable. A large pile-up of articles can apply a tremendous stress to fragile packages or articles, especially when the articles are heavy, or the storage lines are long. Consequently, a slight slant just sufficient to enable the moving articles to continue moving is the optimum for control, safety, and prevention of article damage, but normally prevents re-starting of stopped articles. When an article hangs up, it must be physically nudged forwardly to start it rolling again. This is often done manually by workers, and sometimes by special pushing equipment.

Pushing equipment is conventionally elaborate, complex and expensive when used. It is often heavy, requiring supplemental support such as oversized axles or special brackets. It prevents completely compact storage systems. It may be designed to apply a constant force to the package, even when unneeded, using a supplemental power supply, to assure renewed movement of the packages or articles when the latter are released.

It is an object of this invention to provide an economical and dependable starter for storage racks or gravity conveyors, enabling mounting of the unit at only a slight pitch. Yet, the starter has simple mechanical structure and is formed from a plurality of simple, inexpensive components into a lightweight device. It requires no extra supporting means, and no large power supply to operate it. It is capable of applying the nudging force to the articles only when needed, and not constantly.

It is another object of this invention to provide a carton starter cooperable with the conventional storage rack or conveyor components, particularly the wheel axles, to shift into contact with the article, nudge it forwardly along the conveyor, then drop away from the article permitting return to the original position while disengaged from the article. It is reliable and inexpensive. It enables a storage rack or conveyor line to be considerably longer than normal without difficulty of article hang-up. It enables the pitch to be considerably less, while assuring proper package movement. It reduces line pressure between articles, speed of articles, and conveyor height. More bays of storage can be readily installed in the same space.

These and several other objects of this invention will be apparent upon studying the following specification in conjunction with the drawings in which:

FIG. 10 is a fragmentary sectional view taken on plane X—X of the structure illustrated in FIG. 2;

FIG. 11 is a perspective view of one of the lifting pawls forming part of the novel device;

FIG. 12 is a diagrammatic plan view of a long wheel conveyor section employing the starter device;

FIG. 13 is a fragmentary perspective view of a modified form of the combination employing a roller conveyor;

FIG. 14 is a fragmentary, sectional view of the modified apparatus in FIG. 13, taken on plane XIV—XIV of FIG. 13;

FIG. 15 is a fragmentary sectional view of the apparatus in FIG. 1, showing actuation by a solenoid;

Figure 1:
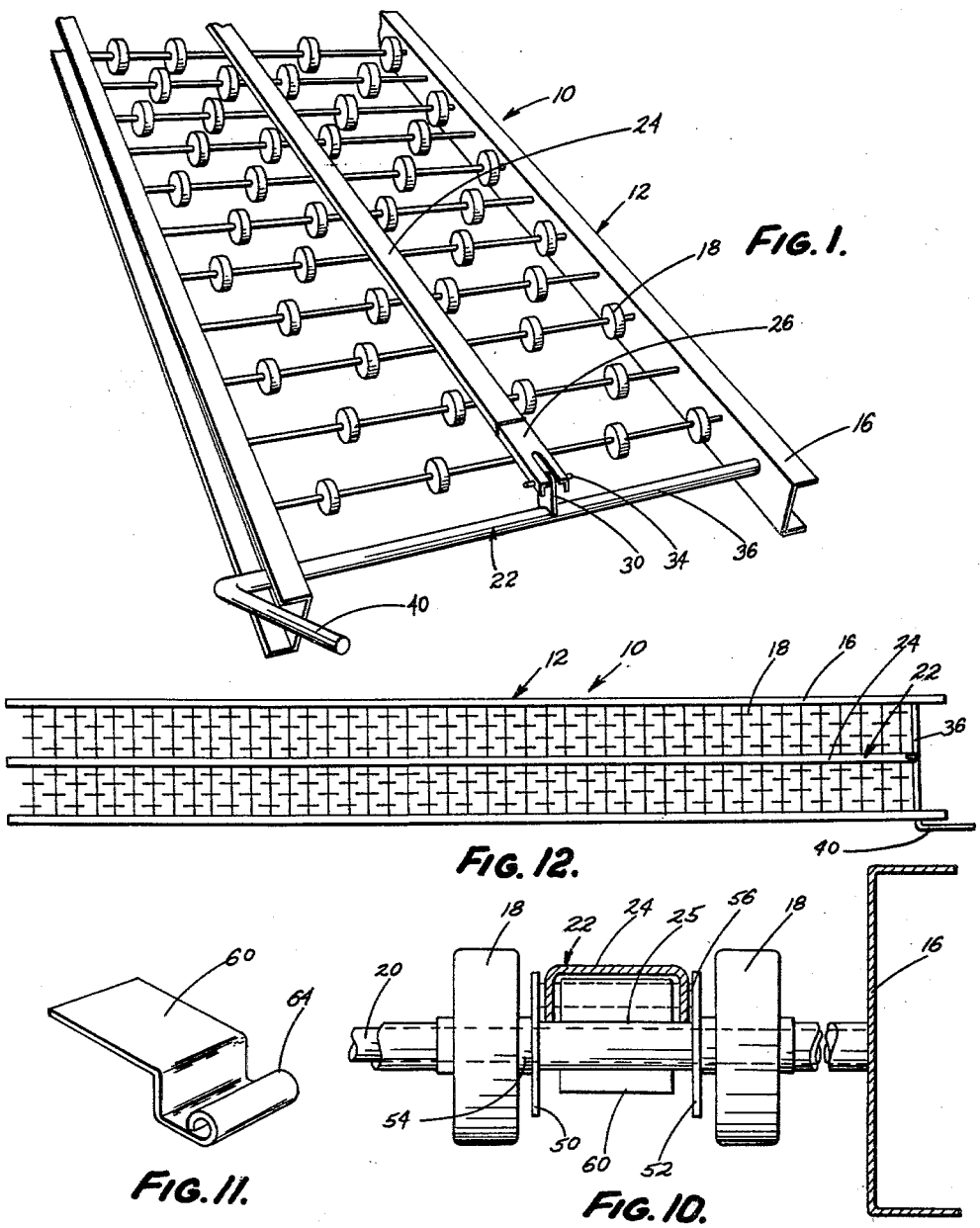
FIG. 1 is a fragmentary perspective view of the novel starter device employed in combination with a gravity wheel conveyor.

Referring specifically to the drawings, the novel combination 10 is especially useful for storage racks. The rack is in effect a section of a conveyor. Therefore, the term "conveyor" when used herein is intended to describe gravity feed storage facilities, and also gravity conveyors. The novel combination 10 comprises a rack or conveyor 12 and a starting mechanism 22. The conveyor 12 has a pair of parallel, spaced side rails or channels 14 and 16, between which a plurality of conveyor wheels 18 are mounted on axles 20. The elongated article starter device 22 normally rests on a plurality of axles 20, and extends longitudinally of the conveyor between the wheels.

Figure 3:
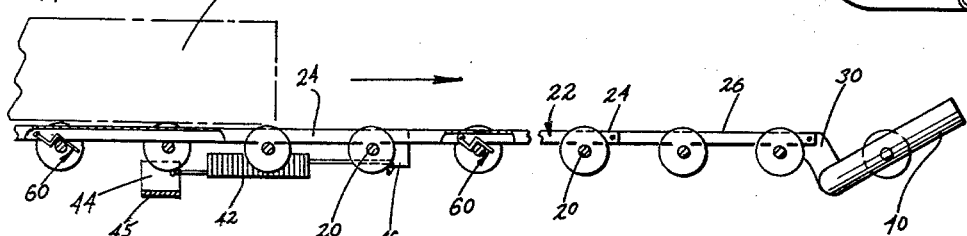
FIG. 3 is a fragmentary, enlarged, side elevational, partially cut away view of the structure shown in FIG. 2.

The elongated bar element 24 has an inverted U channel shape. This provides the necessary height, with light weight, stability, and the capacity for supporting elements between its legs. When the lower edges of the channel rest upon the series of axles 20, the upper surface of the channel is substantially beneath the upper surfaces of the wheel elements 18 (FIGS. 3 and 10).

The forward end of channel element 24 is secured to a connecting or drag link 26 by a pin 28 to provide limited pivotal movement therebetween. The forward end of link 26 is bifurcated to receive an ear or pivot arm 30. The connection between arm 30 and the bifurcated end of link 26 is made with a pivotal pin 34. Pivot arm 30 is affixed as by weldment to tubular actuator sleeve 36 extending transversely of the conveyor.

Within actuator sleeve 36 is a tubular support rod 32 which is keyed to sleeve 36 by a pin 37. Rod 32 extends through side rails 14 and 16 for rotational mounting. One end of rod 32 extending through rail 14 is bent approximately at a right angle with respect to the remainder of the transverse element, to form a manual control or actuator handle 40. Longitudinal shifting of the channel element is achieved by rotation of actuator rod 32 using hand lever 40.

Figure 2:
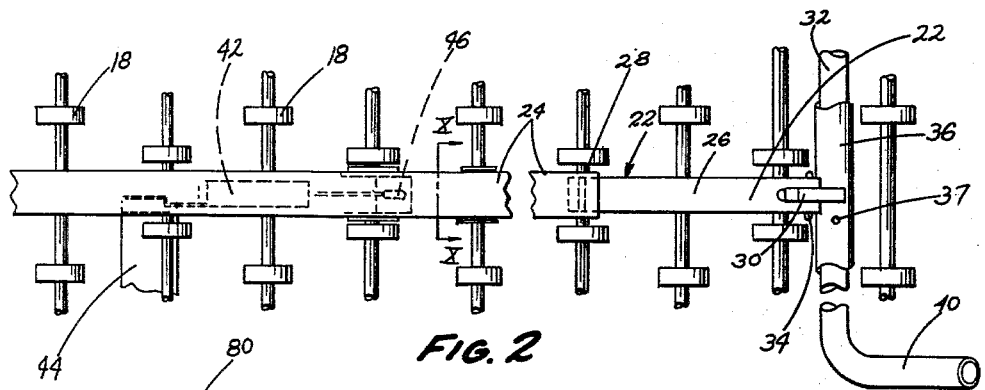
FIG. 2 is a fragmentary enlarged plan view of a portion of the combination.

The channel is normally biased to its retracted, lowered position resting on axles 20 and beneath the upper surfaces of roller wheels 18 by a tension spring 42 which extends between a tab 44 on an anchor plate 45 mounted to rail 16 (FIG. 2), and a bracket 46 secured to the underside of channel 24. Longitudinal shifting of the channel element therefore is against the bias of this tension spring.

The channel element normally extends over a substantial length of the conveyor, and may for example, be 50′ to 100′ long. It is retained in a particular aligned position with respect to the conveyor by suitable means, such as a plurality of sets of washers 50 and 52, or the equivalent, on selected ones of axles 20 (FIG. 10). The washers are normally mounted on different axles than the pawls. The outer surfaces of these washers abut hubs 54 of wheels 18 and, on their inside surfaces, abut the conventional spacer collar 25 around the axle 20. The channel may be centered on the conveyor, or off to one side depending upon the type of articles and their width.

Figure 4:
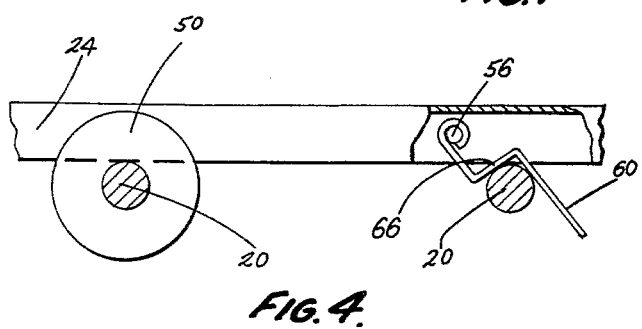
FIG. 4 is a fragmentary enlarged view of a portion of the starter channel and a lifting pawl or cam.
Figure 16:
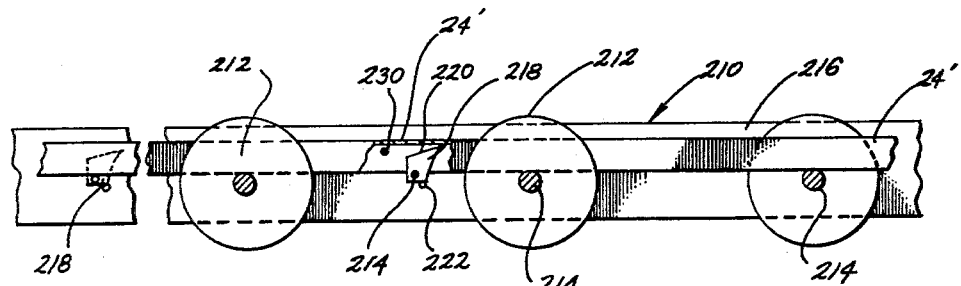
FIG. 16 is a fragmentary, side elevational, sectional view of a further modification employing the broad principles involved.
Figure 17:
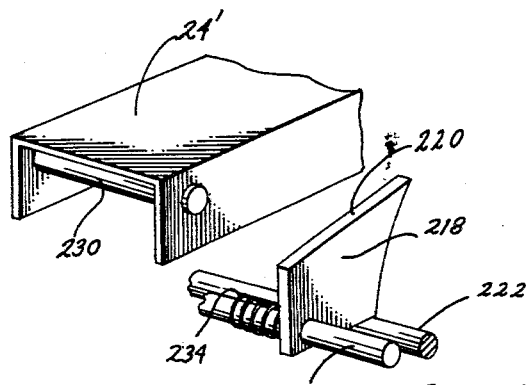
FIG. 17 is a fragmentary perspective view of the apparatus in FIG. 16.
Figure 18:
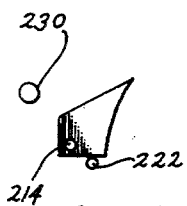
FIGS. 18 through 22 are diagrammatic side elevational views of the sequence of operations during operation of the apparatus in FIGS. 16 and 17.
Figure 19:
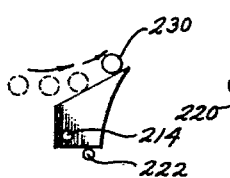
Figure 20:
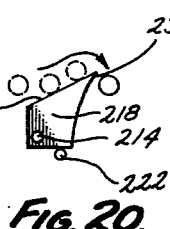
Figure 21:
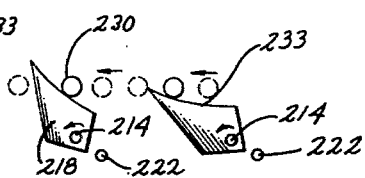

Pins 56 each pivotally support a special depending pawl 60. Each pawl (see FIG. 7) is formed of metal, preferably spring steel, formed on one end into a cylindrical mounting sleeve 64. This upper sleeve receives a mounting pin 56. The pin is secured to the channel legs. The depending pawl includes an upper portion, a lower portion in a plane generally parallel to that of the upper portion, and a central offset portion 66 at right angles to the upper and lower portions to abut and rest on one of axles 20. The length of the upper portion of each lifting pawl 60, between sleeve portion 64 and offset portion 66, is critical for the type of article involved. The length of this upper portion is made purposely greater than the vertical distance between the axis of pin 56 and the upper surface of axle 20. Consequently, each pawl is normally positioned in a forwardly-downwardly diagonal orientation between its mounting pin 56 and axle 20 with which it is associated, when the channel element 24 is in its retracted position, resting on the axles as illustrated in FIG. 4. Descriptively, it appears to be lying on its back. Each pawl constitutes a pivotal, lifting, camming link or spacer which automatically releases from its respective stationary support axle when rotated past vertical orientation.

Figures 5, 6, 7, 8, 9:
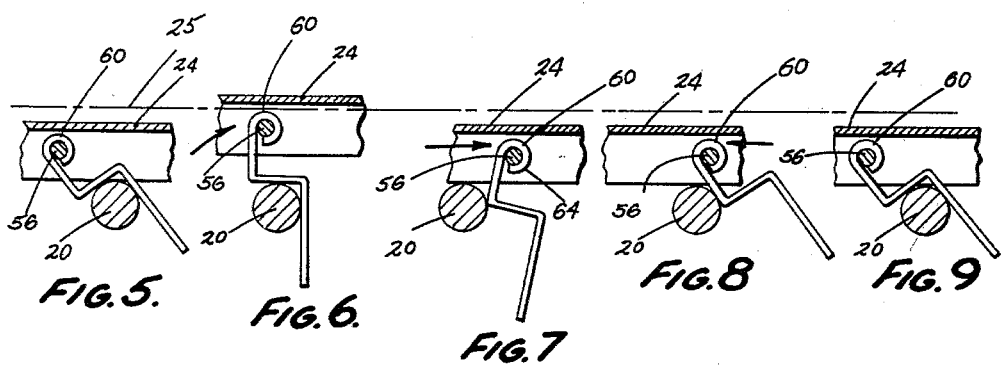
FIGS. 5 through 9 are enlarged fragmentary elevational views showing the sequence of movements of each lifting pawl with respect to a conveyor axle with actuation of the starter.

When lifting bar 24 is shifted longitudinally forwardly, the rotation of the diagonally-positioned, spaced pawls about the respective fixed axles 20 causes the upper ends of the pawls to rise from the position in FIG. 5 to that in FIG. 6. The length of the upper portions of the lifting links (above the offset) is critical and is made sufficient to raise the upper surface of the channel bar to a height adjacent or slightly above the upper surfaces of wheels 18 (see phantom line 25 in FIGS. 5 through 9), and into contact with an article resting upon the rollers. The exact maximum height of the channel with respect to the wheel surfaces varies from one type of article to another. With light weight packages, the channel can move to a height of about 1/32″ above the wheels to actually boost the packages slightly. However, when dealing with heavy articles, too great a force is required to lift a series of them. In this case the channel moves to a height the same as the upper surfaces of the wheels. In some instances where heavy cartons actually bulge downwardly between the wheels, the channel can contact the carton without rising to the top of the wheels. The important thing is that it be raised to article engaging position.

When the links or pawls have reached their zenith in their arcuate path, further shifting of the channel causes a longitudinal forward nudge of the article due to the cessation of the upward motion and the continuation of motion of the channel longitudinally forwardly. As the links begin to tip forwardly (FIG. 7), the offset surfaces slide off the axles, especially under the weight of the articles, causing these links to drop off the respective axles. This causes the channel to drop down into contact with the axles. The particular vertical position of the lifting link at which the link slides off and released from the conveyor axle will vary slightly with the exact angle between the upper end of the link and the offset.

As the channel is retracted to its original position by biasing spring 42, it remains in its lowered position on the axles 20 and moves back only longitudinally. The lifting links or pawls 60 are retracted as illustrated in FIG. 8, by being dragged back across the respective axles 20 while rotating slightly to pass over the wheel axle, until each pawl is in its initial position as in FIG. 9. The offset surface is then again in contact with the axle and is ready for the next shift.

Thus, it will be seen that the longitudinal shifting of the lifting bar creates an upwardly and forwardly arcuate nudging movement on an article 80 resting on the conveyor. Yet, it does not interfere with the article in its return movement, since it automatically drops to a lowered position after nudging the article forwardly, and moves to its return position in this lowered condition so that no further contact with the article is made.

Conceivably, the links may be varied somewhat in shape as long as it engages a fixed support, preferably the axles, to hoist the starter arcuately upwardly and longitudinally, and releases to drop the starter for lowered return movement to the initial starting position. Within the broader aspects of this inventive concept, a linkage of elements could be employed to achieve a lowered return movement.

The longitudinal shifting of the nudging starter bar in the illustrated example, is achieved by depressing hand lever 40, which pivots arm 30, shifts drag link 26 and channel bar 24. A variety of alternative actuators could be utilized in place of the manual hand lever, such as an electrical solenoid, a fluid cylinder, equivalent mechanical levers or linkage, or others. For example, referring to FIG. 15, solenoid 90 has its shaft 92 pivotally connected to one end of a link 93 which is rotatably mounted at 94, and has its other end pivotally connected to the end of elongated starter element 24. Any suitable control circuit 95 having switching means 96 operated manually or automatically and having a power supply 97 is connected to the solenoid. For example, the novel starter has been coupled with an article release mechanism such as is used on live storage racks. When the release is actuated the starter is automatically activated simultaneously. The novel starter is completely dependable in operation to effectuate renewed article movement without further interference, and is capable of rapid repeated action on following articles. The mechanism is extremely simple and inexpensive to manufacture and assemble, and cooperates uniquely with the existing conveyor structure. The device need only be shifted at desired times. It has been found that the pitch can be reduced to about ½ or less of the conventional minimum pitch and still have a more dependable system.

The mechanism has special application to wheel conveyors and storage racks. Within the broader aspects of this invention, the device can be adapted in various forms to different style conveyors to suit the use while employing some of the novel principles in the illustrated form of the invention. Referring to FIGS. 13 and 14, it will be observed that if employed on a roller conveyor 110, added bar elements 112 secured to the side rails 114 and 116 are necessary for the pawls 118 to contact, instead of the axles 120 which support rollers 122. Also, the elongated article contacting element 124 will include vertical projections 126 to fit between the rollers and contact the cartons when elevated. The lifting links may be the same as the previous preferred type or of the modified structure in FIG. 14. These rotate about the bars 112 and hoist the starter element 124 because of their rotational mounting on flanges 130 depending from element 124. Each may be torsion-spring biased to the position in FIG. 14, so that when rotated, and released from bar 112, they spring back to the orientation shown and re-contact bars 112 when the element 124 is returned to its original position shown. Alternatively, a friction surface can be provided on a straight element to contact the bottoms of the rollers, in order to initiate movement, but this is not the preferred form. The device can conceivably be employed as the motivating means on an "inching" non-slanted conveyor. The obvious modifications employing the novel concept are many.

Instead of the pivotal element being mounted to the starter, it may be mounted to the conveyor, to provide the lifting action to the starter when longitudinally shifted, and then drop down out of engagement with the cartons during return movement. Referring to FIGS. 16 through 22, the modified combination shown includes a storage rack or conveyor 210, having a plurality of conveyor wheels 212 mounted on spaced parallel axles 214 secured to side rails 216. The elongated, channel shaped starter element 24' normally rests on axles 214 beneath the upper surfaces of wheels 212 and out of engagement with cartons (not shown).

Positioned along the conveyor is a plurality of lifting cams 218, each pivotally mounted on one of the conveyor wheel axles 214. Each of the cams has a sloping upper surface 220 forwardly of the conveyor. A stop bar 222 is mounted between the conveyor side rails and positioned beneath the bottom of rotational elements 218 to prevent depression of the respective elements when a force is applied downwardly on the elements. Fixed between the legs of channel 24' is a cam surface follower rod 230 in horizontal alignment with cam surface 220.

In operation, longitudinal shifting of element 24' (see arrow FIG. 16), (FIG. 18) causes follower rod 230 to ride up surface 220 (FIG. 19), thereby raising channel starter 24' as it is shifted. The channel moves up to a maximum position adjacent the top of wheels 212, into engagement with the cartons. Then rod 230 drops off the uppermost forward edge of cam 218 (FIG. 20) to lower the starter onto axles 214.

Figure 22:
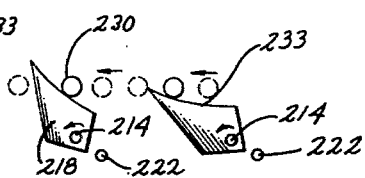

Return movement of element 24' is in lowered position since bar 230 abuts the vertical front face 233 of element 218, and rotates the element away from stop 222 (FIG. 21), and against the torsion spring 234 (FIG. 17) between element 218 and axle 214, until the rod 230 moves free of element 218 (just after FIG. 22). The torsion spring 234 then returns element 218 to the position in FIG. 18 (by clockwise rotation in the view given).

These modifications employing the principles of the broader aspects of the invention, are therefore, deemed to be part of this invention, which is to be limited only by the scope of the appended claims and the reasonably equivalent structures to those defined therein.

I claim:

1. A conveyor-starter combination comprising: a conveyor including a plurality of spaced conveyor wheels mounted on transverse axles; an elongated starter element extending longitudinally of the conveyor, resting on said axles between said wheels, and having its upper surface below the tops of said wheels; a plurality of depending legs pivotally mounted at the upper ends thereof to the bottom of said element, each including an offset portion contacting one of said axles; said legs extending diagonally downwardly and longitudinally forwardly of said conveyor, and causing said element to move upwardly when shifted longitudinally due to the contact of said offset portions on the axles, to raise the upper surface of said element into a position adjacent the tops of said wheels for contacting an article thereon and nudging it longitudinally to start it moving on said wheels; said legs being releasable from said axles to allow said element to drop to said axles after momentary contact with an article; and actuating means to shift said element longitudinally.

2. A conveyor-starter for attachment to a gravity conveyor, comprising: an elongated bar adapted to rest on conveyor axles between conveyor wheels; a plurality of spaced elevating legs pivotally mounted to said bar and depending therefrom, said legs each having a portion forming an offset surface and an adjacent portion forming a surface generally normal to said offset surface, both adapted to abut a conveyor axle to collectively elevate said bar as it is shifted longitudinally and then to slide off the axle to drop said bar for lowered return of said bar; and actuating means operably connected to said bar to shift it longitudinally without lifting it.

3. A conveyor-starter comprising: an elongated inverted channel element adapted to be supported on conveyor axles between the wheels of a conveyor to be normally below the top of the wheels and out of contact with an article on the rollers; shiftable elevating links beneath said element pivotally connected between the legs of the channel, and including a diagonal portion and a notched portion at the base of said diagonal portion to abut and pivot around the conveyor axles to elevate said element in a curved path to a level adjacent said wheel tops when said element is longitudinally shifted, and then to drop off said axles for lowered movement back over said axles when dragged by return movement of said channel element; and shifting means operably associated with said element to longitudinally shift said element when actuated.

4. A conveyor-starter combination, comprising: a conveyor including a plurality of spaced roller elements mounted on spaced transverse axles; and elongated starter element extending longitudinally of the conveyor, normally resting on said axles between said roller elements, and having its upper surface below the tops of said roller elements; link means pivotally connected to one end of said starter element on a horizontal pivotal axis to allow vertical play therebetween; actuating means connected to said link means to pull it and said starter element longitudinally of said conveyor; a plurality of depending lift members pivotally suspended beneath said starter at spaced intervals equal to at least one space between said axles and adjacent thereto; each of said members being downwardly diagonally oriented toward said link means and having an inverted generally V-shaped groove in its undersurface, resting on the respective axle; said members being pivotal on the respective axles with longitudinal shifting of said starter element to raise said starter element until the groove surfaces slide off the respective axles; and said members then sliding to a lowered condition and remaining lowered with reverse movement of said starter element and members.

5. The combination in claim 4 wherein the legs of said groove are generally normal to each other.

6. The combination in claim 4 wherein said members have an inverted Z-shaped configuration with the legs thereof normal to each other at the junctures.

References Cited by the Examiner

UNITED STATES PATENTS

| 666,865 | 1/01 | Helfensteller | 198—219 |
| 1,441,653 | 1/23 | Arnold | 312—71 |
| 1,804,534 | 5/31 | Jones | 221—249 |
| 2,085,395 | 5/37 | Sebell | 221—262 |
| 2,522,896 | 9/50 | Rifkin | 221—279 |
| 2,738,103 | 3/56 | Bisese | 193—40 |
| 3,047,127 | 7/62 | McGaw | 198—160 |

ERNEST A. FALLER, *Primary Examiner.*

ANDRES H. NIELSEN, *Examiner.*